United States Patent [19]

Daimer et al.

[11] Patent Number: 5,145,803
[45] Date of Patent: Sep. 8, 1992

[54] GLASS SEALANT CONTAINING LEAD BORATE GLASS AND FILLERS OF MULLITE AND CORDIERITE

[75] Inventors: Johann Daimer, Oberahrain; Hartmut Paschke, Ergolding, both of Fed. Rep. of Germany

[73] Assignee: Schott Glaswerke, Mainz, Fed. Rep. of Germany

[21] Appl. No.: 600,510

[22] Filed: Oct. 22, 1990

[30] Foreign Application Priority Data

Oct. 20, 1989 [DE] Fed. Rep. of Germany ....... 3934971

[51] Int. Cl.$^5$ .......................... C03C 8/24; C03C 8/14
[52] U.S. Cl. ........................................ 501/15; 501/17; 501/32
[58] Field of Search .................. 501/15, 22, 17, 32

[56] References Cited

U.S. PATENT DOCUMENTS

| | | | |
|---|---|---|---|
| 3,954,486 | 5/1976 | Francel et al. | 501/15 |
| 4,006,028 | 2/1977 | Nofzigor | 501/15 |
| 4,704,370 | 11/1987 | Seki et al. | 501/15 |
| 4,774,208 | 9/1988 | Yamanaka et al. | 501/15 |
| 4,883,777 | 11/1989 | Yananaka | 501/15 |

FOREIGN PATENT DOCUMENTS

| | | |
|---|---|---|
| 2533687 | 4/1975 | Fed. Rep. of Germany . |
| 3911176 | 10/1989 | Fed. Rep. of Germany . |
| 2311328 | 12/1990 | Japan . |
| 3103337 | 4/1991 | Japan . |

OTHER PUBLICATIONS

Hawley's "Condensed Chemical Dictionary", 1987, p. 43.

*Primary Examiner*—William R. Dixon, Jr.
*Assistant Examiner*—Lisa M. Schull
*Attorney, Agent, or Firm*—Millen, White & Zelano

[57] ABSTRACT

A glass sealant comprises a mixture of about 70–90% of a solder glass powder of a low-melting lead-borate glass with a transformation temperature of 330° C. or lower, 1–20% by weight of cordierite powder, and 1–25% by weight of mullite powder, with the combined content of cordierite and mullite powder being from about 10–30%. The lead-borate glass comprises from about 82–88% by weight of PbO, 12–17% by weight of $B_2O_3$, 0–1% by weight of $SiO_2$, and 0–1% by weight of $Al_2O_3$. Both the cordierite and mullite powder are preferably synthetically produced to reduce the α-radiation. The synthetically produced cordierite powder preferably still contains up to about 9% by weight of a non-crystalline vitreous phase. The grain size of the powders is preferably under 100 microns. This glass sealant has well-balanced properties relative to thermal expansion, melting temperature, dielectric constant, loss angle, mechanical strength, thermal shock resistance, and chemical resistance. It is particularly suitable as ceramic dual-line package solder (CERDIP) for sealing of aluminum oxide housings for integrated circuits.

22 Claims, No Drawings

GLASS SEALANT CONTAINING LEAD BORATE GLASS AND FILLERS OF MULLITE AND CORDIERITE

BACKGROUND OF THE INVENTION

1. Field of the Invention

The invention relates to glass sealants, especially for sealing housings made of aluminum oxide ceramics. Such glass sealants are also designated ceramic dual-inline package (CERDIP) solder. Heavy demands are made on these glass sealants when they are used to encapsulate large-scale integrated circuits. The sealants must have a very low melting temperature, a low dielectric constant (DC), a low loss angle (tan delta), excellent chemical resistance, low $\alpha$-particle emission, high mechanical strength, good diathermic adaptation to the housing material and the conductor material, as well as good thermal shock strength.

2. Description of Related Art

Glass sealants especially for integrated circuits are well known in the art. From DE-PS 32 39 039, a glass sealant is known, which consists of a lead-borate glass containing a low-melting bismuth oxide and 8-12% by weight of $\beta$-eucryptite. However, the strength of this glass sealant is mediocre; it tends to sustain microcracks from heat shock, which can result in damage to the integrity of the seal.

In DE-OS 33 29 102, a glass sealant is described, which consists of 50-80% by weight of a low-melting solder glass powder of a PbO—$B_2O_3$ system, 1-35% by weight of a ceramic composition of zinc oxide and silicon dioxide, as well as 1-45% by weight of tin dioxide. This glass sealant has a relatively high density which, to a user of the sealant, appears as a comparatively high consumption (in terms of weight). The electrical properties, such as the dielectric constant and loss angle, are not satisfactory so that problems can occur at high signal velocities. Further, this sealant has unsatisfactory chemical resistance to acids used in an electroplating tin unit in which the electric wires projecting from the sealed housing are tinned. In this unit, undissolved sulfates can form on the free glass sealant surfaces. This leads to difficulties since during electroplating the tin has a tendency to precipitate on the precipitated sulfate, which disturbs or interrupts the normal operation of the encapsulated integrated circuit. The ceramic composition containing silicon dioxide and tin oxide consists mainly of willemite, which has low mechanical strength. In thermal shock tests, it has been found that microcracks are formed in this material.

In DE-OS 33 43 570, a glass sealant is described, comprising 75-50% by volume of a low-melting glass powder with a content of lead oxide as the main component, 20-45% by volume of ceramic powder, especially cordierite, as well as 5-30% by volume of a pulverized solid solution of titanium dioxide and tin dioxide. Also, this glass sealant has a relatively high density and dielectric constant. A high dielectric constant at high signal frequencies can lead to disturbances in large-scale integrated circuits.

From DE-OS 35 09 955, a glass sealant is known, which consists of 50-80% by weight of a solder glass powder made from a lead oxide $B_2O_3$ system, 1-35% by weight of an inert zinc powder, substantial willemite, and 1-35% by weight of synthetic zirconia which, with the exclusion of radioactive substances, is artificially prepared. This glass sealant is relatively expensive due to the synthetic zirconia which requires repeated recrystallization of zirconium salts. Also, this sealant has the disadvantages that the loss angle tan delta and the density are relatively high.

An object of the invention is to provide an improved glass sealant, especially for sealing aluminum oxide ceramic housings for integrated circuits, which at very low melting temperatures has a high mechanical strength, a good sealing capability, high chemical resistance, as well as favorable electrical properties, and especially a low dielectric constant.

Upon further study of the specification and appended claims, further objects and advantages of this invention will become apparent to those skilled in the art.

SUMMARY OF THE INVENTION

An improved glass sealant is formed from a mixture comprising from about 70-90% by weight of a solder glass powder of a low-melting lead borate glass having a transformation temperature smaller than or equal to 330° C., 1-20% by weight of cordierite powder, and 1-25% by weight of mullite powder, the combined content of cordierite and mullite powders being from about 10-30% by weight. The lead-borate glass comprises from about 82-88% by weight of PbO, 12-17% by weight of $B_2O_3$, 0-1% by weight of $SiO_2$, and 0-1% by weight of $Al_2O_3$. The cordierite powder contains up to about 9% by weight of a non-crystalline vitreous phase. This glass sealant is especially suitable for sealing aluminum oxide housings used for integrated circuits.

DETAILED DESCRIPTION

According to the present invention, the low-melting solder glass powder has a transformation temperature (Tg) of about 330° C. or lower. This makes it possible to have a glass sealant with a correspondingly low processing temperature. The processing temperature of the glass sealant of the present invention is, if possible, below 450° C. It has been found that a lead-borate glass with these properties is suitable as a solder glass powder in the glass sealant of the present invention.

A suitable lead-borate glass consists essentially of from about 82-88% by weight of PbO, and 12-17% by weight of $B_2O_3$. This low-melting lead-borate glass has a transformation temperature smaller than or equal to about 330° C. In addition, up to about 1% by weight of $SiO_2$ and $Al_2O_3$ each can also be present. If the upper limit of about 88% by weight of PbO is exceeded, the inclination to devitrification increases, but if there is a drop below the lower limit of about 82% by weight of PbO, the Tg and melting temperature increase. A preferred range for PbO is between about 85% and 86.5% by weight.

The $B_2O_3$ content is preferably between about 12 and 16% by weight. A high $B_2O_3$ content leads to increasing transformation temperatures, whereas at lower $B_2O_3$ concentrations, the danger of devitrification increases. A most preferred range of $B_2O_3$ is between about 13 and 14.5% by weight. The addition of up to about 1% of silicon dioxide or aluminum oxide each can improve the chemical resistance as well as reduce the inclination to devitrification.

This solder glass powder is contained in the glass sealant in concentrations of up to about 70-90% by weight. If the content of the solder glass powder is below about 70%, a reduced fluidity of the glass sealant results, whereas if the content of the solder glass powder exceeds 90% by weight, the coefficient of thermal expansion becomes too great, and the resistance to temperature shock stresses is too greatly reduced. The increase of the coefficient of thermal expansion becomes apparent starting at concentrations of solder glass powder of about 85% by weight. Therefore, a content of solder glass powder of about 70–80% by weight is especially preferred.

The glass sealant of the present invention also contains from about 1–20% by weight of cordierite powder and 1–25% of mullite powder. Cordierite has the greatest influence on the reduction of the thermal expansion coefficient. The coefficient of thermal expansion of mullite is between that of cordierite and lead-borate glass. By the gradation of the coefficient of thermal expansion from cordierite through mullite to lead-borate glass, the mechanical strength of the seal is increased with the glass sealant according to the present invention. Besides the reduction of the coefficient of expansion, the addition of cordierite lowers the dielectric constant and the chemical resistance of the glass sealant is increased. However, if cordierite is used in amounts of over about 20% by weight, the melting temperature of the glass sealant increases because of the greater partial dissolution of the cordierite throughout the solder glass powder, and its fluidity drops. If the concentration of cordierite falls below about 1% by weight, the coefficient of thermal expansion is generally too high. A concentration of cordierite powder of from about 10–15% by weight has been found to be particularly advantageous.

Mullite also reduces the coefficient of thermal expansion of the glass sealant, as well as reducing the dielectric constant, the density, and the fluidity of the glass sealant. However, mullite increases both the chemical resistance and mechanical strength. The concentration of mullite in the glass sealant can range up to about 25% by weight. If the mullite concentration drops below about 1% by weight, the increase in the coefficient of thermal expansion is too great; accordingly, the mullite concentration can range from about 1–25% by weight. A mullite concentration of from about 10–20% by weight is preferred. But, in any case, the total concentration of cordierite and mullite should not exceed about 30% by weight, since higher concentrations, as a whole, lead to deterioration of the flow properties of the glass sealant. The total concentration of cordierite and mullite should not drop below about 15% by weight either; otherwise, both the coefficient of thermal expansion and the dielectric constant become too high.

It is preferred to use a synthetic cordierite, produced by the glass phase, especially when it is desired to reduce the emission of α-particles. Cordierite has the empirical formula $Mg_2Al_4Si_5O_{18}$. Synthetic cordierite can be produced as follows: A mixture containing 22.22 mol % of MgO, 22.22 mol % of $Al_2O_3$, and 55.56 mol % of $SiO_2$ is thoroughly mixed, melted at about 1600° C., the melt is homogenized, and the resulting glass is tempered between counterrotating steel rollers. The glass is then ground in a ball mill to a screen size of under about 100 microns. The conversion of the glass powder to the crystalline phase takes place over a 2-10 hour tempering process at 1000°–1100° C. If desired, the resulting cordierite powder can be ground even finer. Cordierite powder is especially preferred which still contains up to about 9% by weight, more preferably about up to 5% by weight, of uncrystallized vitreous portions (residual glass phase). At the melting temperature of the glass sealant, these vitreous portions are partially dissolved and increase the chemical resistance of the resulting seal. The glass ceramically produced synthetic cordierite described above has a coefficient of thermal expansion of less than $3 \cdot 10^{-6} k^{-1}$.

Mullite is an orthorhombic crystallized aluminum silicate in the composition range of from $Al_2O_3 \cdot SiO_2$ to $2 Al_2O_3 \cdot SiO_2$, especially $3 Al_2O_3 \cdot 2 SiO_2$. Although natural mullite can be used, it is preferred to use synthetic mullite which can be produced by mixing stoichiometric amounts of aluminum oxide with silicon dioxide, firing the mixture at high temperature, and grinding to a screen size of less than about 100 microns. A mullite having the composition $3 Al_2O_3 \cdot 2 SiO_2$ is preferred.

To ensure that the glass sealant, after melting, will have a uniform composition, the individual powdered constituents preferably have a grain size of under about 100 microns. By grain size, it is understood that the powder must go through a sieve having a mesh size of 100 microns. Depending on the application process of the glass sealant used (e.g., silk screen printing), grain sizes under 63 microns can also be advantageous. When the glass sealant of the present invention is used in a conventional manner, it is prepared by forming a paste of the desired viscosity with a suitable auxiliary agent such as the so-called silk screen printing oil, a more or less viscous mineral or natural oil or a solvent with some glue or binder in it, or even water with some binder in it can be used. Sealing with the glass sealants of the present invention can be made by application of heat to melt the glass powder and yield a pore-free coating.

The glass sealant according to the present invention has a well-balanced spectrum of properties. By the use of three components—namely, lead-borate glass, mullite, and cordierite—graduated relative to one another with respect to the coefficient of thermal expansion, the mechanical stresses between the lead-borate glass and the filler particles is reduced. As a result, the danger of microcracks is reduced, and the mechanical strength of the sealant is increased. Besides increased mechanical strength, the glass sealant has a lower coefficient of thermal expansion, a lower dielectric constant, a low density, a low α-particle emission, and a higher chemical resistance.

The glass sealant of the present invention is especially useful as a sealant for ceramic IC packages as CERDIPS (ceramic dual inline packages) and ceramic chip carriers in the electronic and computer industry. An IC package consists of ceramic chips with three-dimensional printed circuits and connecting pins coming out of the package. The package has to be sealed (encapsulated) hermetically. After sealing the pins, which are made of copper, sometimes also of brass or iron, they are metal-plated to provide corrosion resistance, i.e., gold plated or tin plated. Consequently, the solders have to withstand the acids used in galvanization.

Without further elaboration, it is believed that a person skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

EXAMPLES

In the following examples, different amounts of a lead-borate powder with a grain size of under 100 microns and a composition of 85% by weight of PbO, 14% by weight of $B_2O_3$, and 0.5% by weight of $SiO_2$ and $Al_2O_3$ each are mixed with different amounts of cordierite powder having a grain size of less than 63 microns and mullite powder having a grain size of less than 63 microns. Both the cordierite and mullite were synthetically produced. The cordierite still contained about 5% by weight of vitreous phase, and the mullite corresponded to the composition 3 $Al_2O_3$.2 $SiO_2$. The melting temperature in °C., the coefficient of thermal expansion in the temperature range the resulting glass sealants were determined. The results are compiled in Table 1, below.

Further, the chemical resistance of the glass sealants was determined. For this purpose, the glass sealants were immersed in a 10% mineral acid at a temperature of 30° C. for 2 minutes. After rinsing, the weight loss per surface unit was determined. There resulted, e.g., for a glass sealant according to Example 3, a weight loss of about 0.08 mg/cm² in sulfuric acid, 1.1 mg/cm² in hydrochloric acid, and 55 mg/cm² in nitric acid. These small weight losses show that the glass sealant is very resistant to acids, especially to sulfuric acid used in tinning.

The preceding examples can be repeated with similar success by substituting the generically or specifically described reactants and/or operating conditions of this invention for those used in the preceding examples.

From the foregoing description, one skilled in the art can easily ascertain the essential characteristics of the invention and, without departing from the spirit and scope thereof, can make various changes and modifications of the invention to adapt it to various usages and conditions.

TABLE 1

| Examples | 1 | 2 | 3 | 4 | 5 | 6 | 7 | 8 | 9 |
|---|---|---|---|---|---|---|---|---|---|
| PbO—$B_2O_3$ glass (wt. %) | 80 | 75 | 75 | 70 | 85 | 90 | 85 | 85 | 70 |
| Cordierite (wt. %) | 10 | 10 | 15 | 15 | 7.5 | 5 | 10 | 5 | 10 |
| Mullite (wt. %) | 10 | 15 | 10 | 15 | 7.5 | 5 | 5 | 10 | 20 |
| Melting temp. °C.* | 405 | 425 | 425 | 440 | 390 | 385 | 390 | 390 | 445 |
| Coefficient of thermal expansion | 6.90 | 6.30 | 5.90 | 5.50 | 7.70 | 8.90 | 7.60 | 8 | 5.70 |
| Dielectric constant (1 MHz, 25° C.) | 12 | 11.40 | 11.20 | 10.70 | 12.70 | 13.60 | 12.60 | 12.90 | 10.90 |
| Density g/cm³ | 5 | 4.70 | 4.60 | 4.40 | 5.10 | 5.40 | 5.10 | 5.20 | 5.40 |

*The melting temperature is determined in a furnace with a linearly increasing temperature profile and is the temperature at which the glass sealant flows in 30 minutes so that the surface is smooth.

What is claimed is:

1. A glass sealant formed from a mixture consisting essentially of from about 70-90% by weight of a solder glass powder of a low-melting lead-borate glass having a transformation temperature smaller than or equal to about 330° C., 1-20% by weight of cordierite powder, and 1-25% by weight of mullite powder, the combined content of the cordierite and mullite powder being about 10-30% by weight, said cordierite being a synthetic cordierite having a coefficient of thermal expansion of less than about $3 \cdot 10^{-6} K^{-1}$.

2. A glass sealant according to claim 1, wherein the solder glass powder consists essentially of from about 82-88% by weight of PbO, 12-17% by weight of $B_2O_3$, 0-1% by weight of $SiO_2$, and 0-1% by weight of $Al_2O_3$.

3. A glass sealant according to claim 1, wherein the cordierite powder contains up to about 9% by weight of a non-crystalline vitreous phase.

4. A glass sealant according to claim 1, wherein the powders have a grain size of less than about 100 microns.

5. A glass sealant according to claim 3, wherein the powders have a grain size of less than about 63 microns.

6. A glass sealant according to claim 1, wherein the mixture consists essentially of from about 70-80% by weight of solder glass powder, 10-15% by weight of cordierite powder, and 10-20% by weight of mullite powder.

7. A glass sealant formed from a mixture consisting essentially of from about 70-80% by weight of a low-melting lead-borate glass powder having a transformation temperature smaller than or equal to 330° C., 10-15% by weight of cordierite powder containing up to about 5% by weight of an uncrystallized vitreous phase, and 10-20% by weight of mullite powder, the combined weight of the cordierite and mullite being from about 20-30% by weight, said lead-borate glass consisting essentially of from about 85-86.5% by weight of PbO, 12-16% by weight of $B_2O_3$, and up to about 1% by weight $SiO_2$ and $Al_2O_3$ each, said cordierite being a synthetic cordierite having a coefficient of thermal expansion of less than about $3 \cdot 10^{-6} K^{-1}$.

8. The glass sealant according to claim 7, wherein the powders have a grain size of less than about 63 microns.

9. The glass sealant according to claim 7, wherein the mullite is synthetically produced and has the formula $3 Al_2O_3 . 2 SiO_2$.

10. A paste consisting essentially of a liquid mixed with the composition of claim 1.

11. In an aluminum oxide housing sealed with a glass sealant, said housing being suitable for integrated circuits, the improvement wherein the glass sealant is formed from a mixture consisting essentially of from about 70-90% by weight of a solder glass powder of a low-melting lead-borate glass having a transformation temperature smaller than or equal to about 330° C., 1-20% by weight of synthetic cordierite powder, and 1-25% by weight of mullite powder, the combined content of the cordierite and mullite powder being about 10-30% by weight.

12. In a process for producing an aluminum oxide housing suitable for integrated circuits, consisting essentially of heating a glass sealant until it fuses to form a substantially pore-free seal to hermetically seal the housing, the improvement wherein the glass sealant is formed from a mixture consisting essentially of from about 70-90% by weight of a solder glass powder of a low-melting lead-borate glass having a transformatemperature smaller than or equal to about 330° C., 1-20% by weight of synthetic cordierite powder, and 1-25% by weight of mullite powder, the combined content of the cordierite and mullite powder being about 10-30% by weight.

13. An aluminum oxide housing according to claim 11, wherein the solder glass powder consists essentially of from abut 82-88% by weight of PbO, 12-17% by weight of $B_2O_3$, 0-1% by weight of $SiO_2$, and 0-1% by weight of $Al_2O_3$.

14. An aluminum oxide housing according to claim 11, wherein the cordierite has a coefficient of thermal expansion of less than about $3 \cdot 10^{-6} K^{-1}$.

15. An aluminum oxide housing according to claim 14, wherein the cordierite powder contains up to about 9% by weight of a non-crystalline vitreous phase.

16. An aluminum oxide housing according to claim 11, wherein the powders having a grain size of less than about 100 microns.

17. An aluminum oxide housing according to claim 15, wherein the powders have a grain size of less than about 63 microns.

18. An aluminum oxide housing according to claim 11, wherein the mixture consists essentially of from about 70-80% by weight of solder glass powder, 10-15% by weight of cordierite powder, and 10-20% by weight of mullite powder.

19. An aluminum oxide housing according to claim 11, wherein a glass sealant is formed from a mixture consisting essentially of from about 70-80% by weight of a low-melting lead-borate glass powder having a transformation temperature smaller than or equal to 330° C., 10-15% by weight of synthetic cordierite powder containing up to about 5% by weight of an uncrystallized vitreous phase, and 10-20% by weight of mullite powder, the combined weight of the cordierite and mullite being from about 20-30% by weight, said lead-borate glass consisting essentially of from about 85-86.5% by weight of PbO, 12-16% by weight of $B_2O_3$, and up to about 1% by weight of $SiO_2$ and $Al_2O_3$ each.

20. An aluminum oxide housing according to claim 19, wherein the powders have a grain size of less than about 63 microns.

21. An aluminum oxide housing according to claim 19, wherein the synthetic cordierite has a coefficient of thermal expansion of less than about $3 \cdot 10^{-6} K^{-1}$.

22. An aluminum oxide housing according to claim 19, wherein the mullite is synthetically produced and has the formula $$3Al_2O_3 \cdot 2 SiO_2.$$

* * * * *